United States Patent
Kaytovich

(12) 
(10) Patent No.: US 6,314,911 B1
(45) Date of Patent: Nov. 13, 2001

(54) PET FEEDING BOWL WITH AROMA FLOW HOLES

(76) Inventor: Genady Kaytovich, 160 Delacy Ave., North Plainfield, NJ (US) 07060

( * ) Notice: Subject to any disclaimer, the term of this patent is extended or adjusted under 35 U.S.C. 154(b) by 0 days.

(21) Appl. No.: 09/484,702

(22) Filed: Jan. 18, 2000

Related U.S. Application Data

(60) Provisional application No. 60/125,520, filed on Mar. 22, 1999.

(51) Int. Cl.[7] .................................................... A01K 5/01
(52) U.S. Cl. ............................................. 119/61; 220/574
(58) Field of Search .......................... 119/61; 126/377.1; 220/4.27, 574, 575; 209/373, 374

(56) References Cited

U.S. PATENT DOCUMENTS

| | | | |
|---|---|---|---|
| D. 105,367 | * 7/1937 | Swordling | 220/575 X |
| 2,622,591 | * 12/1952 | Bramberry | 126/381.1 |
| 4,949,678 | * 8/1990 | Demko | 119/61 |
| 5,139,166 | * 8/1992 | Smith | 220/574 |

FOREIGN PATENT DOCUMENTS

2627052 * 8/1989 (FR) ...................................... 119/61

\* cited by examiner

*Primary Examiner*—Robert P. Swiatek
(74) *Attorney, Agent, or Firm*—Goldstein Law Offices, P.C.

(57) ABSTRACT

A pet feeding bowl with aroma flow holes including a dish portion having an open upper end, a closed lower end, and a cylindrical side wall therebetween. The closed lower end holds a piece of human food on an interior surface thereof. A bowl portion is dimensioned for being received within the open upper end of dish portion. The bowl portion rests atop the open upper end whereby a closed lower end of the bowl portion is disposed above the piece of human food positioned within the dish portion. The bowl portion has a plurality of small apertures therethrough.

4 Claims, 1 Drawing Sheet

PET FEEDING BOWL WITH AROMA FLOW HOLES

CROSS REFERENCES AND RELATED SUBJECT MATTER

This application claims the benefits of provisional patent application serial No. 60/125,520, filed in the United States Patent & Trademark Office on Mar. 22, 1999.

BACKGROUND OF THE INVENTION

The present invention relates to a pet feeding bowl with aroma flow holes and more particularly pertains to tricking a pet into thinking that human food disposed below the bowl is what they are eating.

Often dogs and other pets lose interest in their everyday pet foods. Usually owners remedy this situation in feeding their pets table food, food that they would normally eat. This often results in the pet expecting to be fed this food and will cause them to totally disregard their pet food. This is a habit that is difficult, if not impossible to break. The only solution to this problem is to feed the pet table food. This solution is often very costly. The present invention seeks to solve this problem by providing a pet dish that can be used to capture the odors associated with human foods while at the same time having the pet eat their normal pet food and preserving the human food for a next use.

The use of feeding devices for pets is known in the prior art. More specifically, feeding devices for pets heretofore devised and utilized for the purpose of attracting a dog to its food are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,377,621 to Camm discloses a drinking dish for an animal comprised of a filtering screen forming a grid pattern for use in preventing an animal from inadvertently consuming foreign matter. U.S. Pat. No. 5,592,899 to English discloses a means for feeding a dog by spraying a substance with a pleasing aroma to attract the dog to the food. U.S. Pat. No. 5,297,504 to Carrico discloses a spill resistant animal container.

While these devices fulfill their respective, particular objective and requirements, the aforementioned patents do not describe a pet feeding bowl with aroma flow holes for tricking a pet into thinking that human food disposed below the bowl is what they are eating.

In this respect, the pet feeding bowl with aroma flow holes according to the present invention substantially departs from the conventional concepts and designs of the prior art, and in doing so provides an apparatus primarily developed for the purpose of tricking a pet into thinking that human food disposed below the bowl is what they are eating.

Therefore, it can be appreciated that there exists a continuing need for new and improved pet feeding bowl with aroma flow holes which can be used for tricking a pet into thinking that human food disposed below the bowl is what they are eating. In this regard, the present invention substantially fulfills this need.

SUMMARY OF THE INVENTION

In the view of the foregoing disadvantages inherent in the known types of feeding devices for pets now present in the prior art, the present invention provides an improved pet feeding bowl with aroma flow holes. As such, the general purpose of the present invention, which will be described subsequently in greater detail, is to provide a new and improved pet feeding bowl with aroma flow holes and method which has all the advantages of the prior art and none of the disadvantages.

To attain this, the present invention essentially comprises a dish portion having a frustoconical configuration. The dish portion has an open upper end, a closed lower end, and a cylindrical side wall therebetween. The cylindrical side wall is angled outwardly from the open upper end to the closed lower end. The closed lower end holds a piece of human food on an interior surface thereof. A bowl portion is dimensioned for being received within the open upper end of dish portion. The bowl portion rests atop the open upper end whereby a closed lower end of the bowl portion is disposed above the piece of human food positioned within the dish portion. The bowl portion has an outwardly extending peripheral flange for engaging the open upper end of the dish portion. The bowl portion has a plurality of small apertures therethrough.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved pet feeding bowl with aroma flow holes which has all the advantages of the prior art feeding devices for pets and none of the disadvantages.

It is another object of the present invention to provide a new and improved pet feeding bowl with aroma flow holes which may be easily and efficiently manufactured and marketed.

It is a further object of the present invention to provide a new and improved pet feeding bowl with aroma flow holes which is of durable and reliable construction.

An even further object of the present invention is to provide a new and improved pet feeding bowl with aroma flow holes which is susceptible of a low cost of manufacture with regard to both materials and labor, and which accordingly is then susceptible of low prices of sale to the consuming public, thereby making such a pet feeding bowl with aroma flow holes economically available to the buying public.

Even still another object of the present invention is to provide a new and improved pet feeding bowl with aroma flow holes for tricking a pet into thinking that human food disposed below the bowl is what they are eating.

Lastly, it is an object of the present invention to provide a new and improved pet feeding bowl with aroma flow holes including a dish portion having an open upper end, a closed lower end, and a cylindrical side wall therebetween. The closed lower end holds a piece of human food on an interior surface thereof. A bowl portion is dimensioned for being received within the open upper end of dish portion. The bowl portion rests atop the open upper end whereby a closed lower end of the bowl portion is disposed above the piece of human food positioned within the dish portion. The bowl portion has a plurality of small apertures therethrough.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
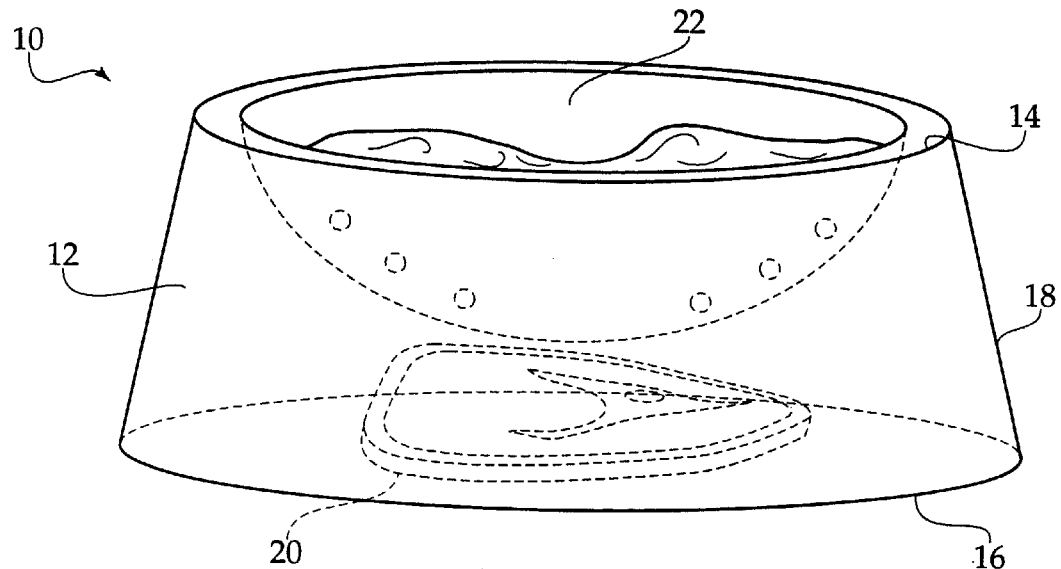
FIG. 1 is a perspective view of the preferred embodiment of the pet feeding bowl with aroma flow holes constructed in accordance with the principles of the present invention.
Figure 2:
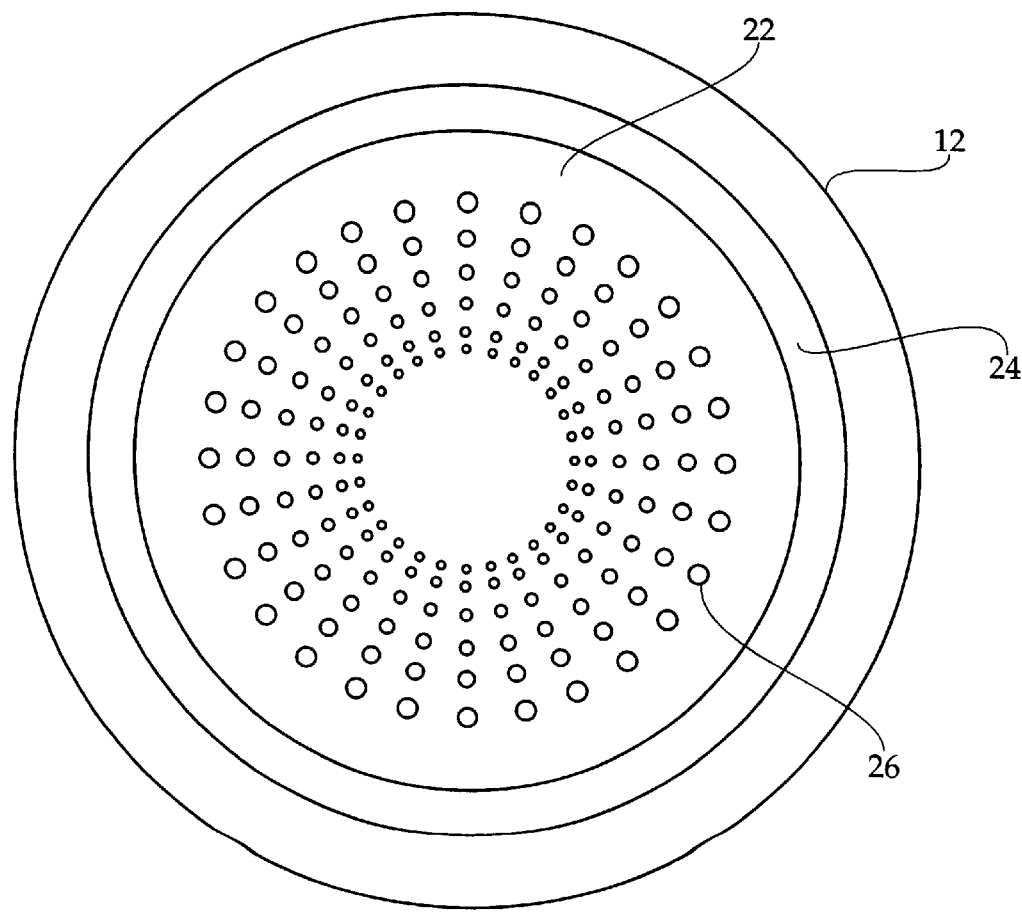
FIG. 2 is a top plan view of the present invention.

With reference now to the drawings, and in particular, to FIGS. 1 through 2 thereof, the preferred embodiment of the new and improved pet feeding bowl with aroma flow holes embodying the principles and concepts of the present invention and generally designated by the reference number 10 will be described.

Specifically, it will be noted in the various Figures that the device relates to a pet feeding bowl with aroma flow holes for tricking a pet into thinking that human food disposed below the bowl is what they are eating. In its broadest context, the device consists of a dish portion and a bowl portion. Such components are individually configured and correlated with respect to each other so as to attain the desired objective.

The dish portion 12 has a frustoconical configuration. The dish portion 12 has an open upper end 14, a closed lower end 16, and a cylindrical side wall 18 therebetween. The cylindrical side wall 18 is angled outwardly from the open upper end 14 to the closed lower end 16. The closed lower end 16 holds a piece of human food 20 on an interior surface thereof.

The bowl portion 22 is dimensioned for being received within the open upper end 14 of dish portion 12. The bowl portion 22 rests atop the open upper end 14 whereby a closed lower end of the bowl portion 22 is disposed above the piece of human food 20 positioned within the dish portion 12. The bowl portion 22 has an outwardly extending peripheral flange 24 for engaging the open upper end 14 of the dish portion 12. The bowl portion 22 has a plurality of small apertures 26 therethrough. The bowl portion 22 would be filled with the pet food while the aroma from the food 20 positioned therebelow would permeate through the small apertures 26 whereby the aroma would fool the pet into thinking that their pet food is actually the human food 20 that they smell. The bowl portion 22 has no lid, and of course remains open during useage thereof, so that the pet can eat from the bowl portion 22.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A pet feeding bowl with aroma flow holes for tricking a pet into thinking that human food disposed below the bowl is what they are eating comprising, in combination:

a dish portion having a frustoconical configuration, the dish portion having an open upper end, a closed lower end, and a cylindrical side wall therebetween, the cylindrical side wall being angled outwardly from the open upper end to the closed lower end, the closed lower end holding a piece of human food on an interior surface thereof;

a bowl portion dimensioned for being received within the open upper end of dish portion, the bowl portion resting atop the open upper end whereby a closed lower end of the bowl portion is disposed above the piece of human food positioned within the dish portion, the bowl portion having an outwardly extending peripheral flange for engaging the open upper end of the dish portion, the bowl portion having a plurality of small apertures therethrough, the bowl having no lid and remaining open during useage thereof.

2. A pet feeding bowl with aroma flow holes for tricking a pet into thinking that human food disposed below the bowl is what they are eating comprising, in combination:

a dish portion having an open upper end, a closed lower end, and a cylindrical side wall therebetween, the closed lower end holding a piece of human food on an interior surface thereof and substantially liquid-free;

a bowl portion dimensioned for being received within the open upper end of the dish portion, the bowl portion resting atop the open upper end whereby a closed lower end of the bowl portion is disposed above the piece of human food positioned within the dish portion, the bowl portion having a plurality of small apertures therethrough, the bowl having no lid and remaining open during useage thereof said piece of human food being substantially larger than the diameter of each aperture.

3. The pet feeding bowl with aroma flow holes as set forth in claim 2 wherein the dish portion has a frustoconical configuration whereby the cylindrical side wall is angled outwardly from the open upper end to the closed lower end.

4. The pet feeding bowl with aroma flow holes as set forth in claim 2 wherein the bowl portion has an outwardly extending peripheral flange for engaging the open upper end of the dish portion.

* * * * *